(12) United States Patent
Lim (10) Patent No.: US 10,873,467 B2
(45) Date of Patent: Dec. 22, 2020

(54) METHOD AND SYSTEM FOR COMPRESSION AND OPTIMIZATION OF IN-LINE AND IN-TRANSIT INFORMATION SECURITY DATA

(71) Applicant: Certis Cisco Security Pte Ltd, Singapore (SG)

(72) Inventor: Keng Leng Albert Lim, Singapore (SG)

(73) Assignee: Certis Cisco Security Pte Ltd, Singapore (SG)

( * ) Notice: Subject to any disclaimer, the term of this patent is extended or adjusted under 35 U.S.C. 154(b) by 303 days.

(21) Appl. No.: 16/077,363

(22) PCT Filed: Feb. 15, 2016

(86) PCT No.: PCT/SG2016/050075
§ 371 (c)(1),
(2) Date: Aug. 10, 2018

(87) PCT Pub. No.: WO2017/142475
PCT Pub. Date: Aug. 24, 2017

(65) Prior Publication Data
US 2019/0058597 A1 Feb. 21, 2019

(51) Int. Cl.
*H04L 29/06* (2006.01)
*G06F 21/00* (2013.01)
(Continued)

(52) U.S. Cl.
CPC ........ *H04L 9/3247* (2013.01); *G06F 11/3476* (2013.01); *G06F 16/313* (2019.01);
(Continued)

(58) Field of Classification Search
CPC combination set(s) only.
See application file for complete search history.

(56) References Cited

U.S. PATENT DOCUMENTS 7,434,109 B1* 10/2008 Stabile ............... H04L 41/0681
709/223
2012/0330918 A1* 12/2012 Carey ................... H04L 41/069
707/705

(Continued)

OTHER PUBLICATIONS

International Search Report from Australian Patent Office dated Apr. 12, 2016 for relating International Application No. PCT/SG2016/050075.

(Continued)

*Primary Examiner* — Lisa C Lewis
(74) *Attorney, Agent, or Firm* — BakerHostetler (57) ABSTRACT

This document discloses a method and system for just-in-time compression and optimization of raw unstructured in-line and in-transit data by identifying low entropy data blocks or duplicated information security information in raw computer security alerts within a series of time windows. In particular, the method and system automatically manages; processes; and optimizes in-line and in-transit data blocks or raw information security alerts received from a plurality of information surveillance sources and/or peripheral monitoring devices simultaneously. The data blocks or raw information security alerts that are found to be unique in the various time windows are transposed into meta-definition tables to be further processed while redundant data blocks or raw alerts contained within each particular time window are identified, marked and processed accordingly.

14 Claims, 5 Drawing Sheets

(51) Int. Cl.
    *H04L 9/32*         (2006.01)
    *G06F 11/34*       (2006.01)
    *G06F 21/55*       (2013.01)
    *G06F 16/31*       (2019.01)

(52) U.S. Cl.
    CPC ............ *G06F 21/55* (2013.01); *H04L 9/3239* (2013.01); *H04L 9/3297* (2013.01); *H04L 63/1416* (2013.01); *H04L 63/1425* (2013.01); *G06F 2221/2125* (2013.01); *H04L 2209/30* (2013.01)

(56) References Cited

U.S. PATENT DOCUMENTS

| | | | | |
|---|---|---|---|---|
| 2013/0018932 A1* | 1/2013 | Bhaskar | .................. | H04L 65/60 708/203 |
| 2014/0096249 A1* | 4/2014 | Dupont | ................. | G06F 21/552 726/23 |
| 2014/0223030 A1* | 8/2014 | Bhaskar | .................. | H04L 69/04 709/247 |
| 2020/0053110 A1* | 2/2020 | Wan | .................... | H04L 63/1425 |

OTHER PUBLICATIONS

Written Opinion from Australian Patent Office dated Apr. 12, 2016 for relating International Application No. PCT/SG2016/050075.
International Preliminary Report on Patentability from Australian Patent Office dated Sep. 1, 2016 for relating International Application No. PCT/SG2016/050075.

\* cited by examiner

METHOD AND SYSTEM FOR COMPRESSION AND OPTIMIZATION OF IN-LINE AND IN-TRANSIT INFORMATION SECURITY DATA

CROSS REFERENCED APPLICATIONS

This application is a national stage filing of PCT Application PCT/SG2016/050075 filed on Feb. 15, 2016 that is hereby incorporated by reference in its entirety as if set forth herewith.

FIELD OF THE INVENTION

The present invention relates to a method and system for just-in-time compression and optimization of raw unstructured in-line and in-transit data by identifying low entropy data blocks or duplicated information security information in raw computer security alerts within a series of time windows. In particular, the method and system automatically manages; processes; and optimizes in-line and in-transit data blocks or raw information security alerts received from a plurality of information surveillance sources and/or peripheral monitoring devices simultaneously. The data blocks or raw information security alerts that are found to be unique in the various time windows are transposed into meta-definition tables to be further processed in accordance with embodiments of the invention while redundant data blocks or raw alerts contained within each particular time window are identified, marked and processed accordingly.

BACKGROUND OF THE INVENTION

Security event managers are devices that are utilized in computer networks to centralize the collection, storage and processing of raw computer security alerts in the form of computer generated logs, or records generated by monitoring devices of the computer networks. These monitoring devices are not limited to computer security peripherals but also surveillance equipment such as wired and wireless video cameras and real time analytic processing equipment for voice or similar cognitive devices. Not only do these event managers handle extremely large amounts of data, but they also process unstructured raw data, which typically include data of various formats and sizes.

As existing computer networks utilize a substantial number of monitoring devices, the number of logs generated by these monitoring devices increases rapidly as well. The reason for this is that each monitoring device will generate logs or records each time an incident occurs and these logs are all sent to the event manager. In addition to the above, the number of logs generated gradually increases over time as network operators add new and more powerful monitoring tools for logging and identifying potential security threats. Regardless of the type of tool adopted, most of these tools produce data that are stored in the form of event logs. These event logs may consist of alarm/disturbance notifications, performance logs generated by a Network Management System (NMS) or network elements, operating system logs, network activities and any other such events. These event logs are monitored so that potentially undesirable computing activities such as network-based attacks and/or host-based security breaches may be quickly detected and attended to.

Presently, collected log data and/or records of such nature (termed as information security events) are collected at the event manager. The collected data is then further processed (correlated, encrypted, etc.) before it is transmitted to a command centre to be analysed by computer security analysts. However, as large volumes of log files are generated per day, a bottleneck occurs at the event manager whereby data to be transmitted is queued to be transmitted in a FIFO (First-in First-out) manner.

In order to properly monitor and prevent problems as well as security breaches of the computer network, the computer security analysts should able to receive these logs from the event manager instantaneously and regularly so that these logs may be quickly analysed to identify any abnormal log entries or early signs of troubles. In practice, however, this is an uphill task. The logs to be transmitted are usually voluminous—at worst comprises millions of lines per day and filled with entries of varying formats which makes it difficult for the bottleneck of data to be easily resolved.

To address this bottleneck issue, it has been proposed that the number of event managers utilized in each computer network be scaled according to the number of monitoring devices that are utilized. For example, it is proposed that each event manager should only act as a centralized data collection centre for up to ten (10) monitoring devices. This means that as the number of monitoring devices increases, the number of event managers employed in a computer network should increase accordingly as well. Such an approach is disadvantageous as it requires the addition of additional event managers that may not be backward compatible with the existing network devices. These compatibility issues may in turn result in the transmission or collection of corrupted event logs.

In general, all the event logs obtained from the various monitoring devices would still have to be queued to be processed and transmitted from the event manager to the command centre. Even if a potential threat or attack has been logged, a security analyst would not be made aware of the potential threat until the event logs have been received and processed by the analyst at the command centre.

For the above reasons, those skilled in the art are constantly striving to come up with a system and method that is capable of performing bit-rate level optimization and compression of in-transit large volumes of raw unstructured data to determine which data logs or raw alerts are redundant. Data logs or raw alerts that are identified as redundant are then omitted, and data logs or raw alerts that are useful are then processed and transmitted for further analysis.

SUMMARY OF THE INVENTION

The above and other problems are solved and an advance in the art is made by systems and methods provided by embodiments in accordance with the invention. A first advantage of some embodiments of systems and methods in accordance with the invention is that as redundant raw alerts and non-redundant raw alerts may be identified at high speed from raw unstructured data-in-transit, only non-redundant raw alerts are processed, i.e. aggregated, compressed and aggregated while redundant raw alerts are not processed, thereby reducing a load on the computer system.

A second advantage of many embodiments of systems and methods in accordance with the invention is that regardless of the data format or data size of each raw alert, the raw alerts may still be processed as categorized accordingly. This allows large volumes of data to be easily and quickly processed.

A third advantage of some embodiments of systems and methods in accordance with the invention is that the systems and processes can be modularized and embedded into independent software and hardware based operational systems to function as an in-line cache analyser module to constantly categorize raw alerts thereby ensure that non-redundant raw alerts are only subjected to further processing steps.

The above advantages are provided by a number of embodiments of a method in accordance with the invention operating in the following manner.

According to a first broad aspect of the present invention, there is provided a method for determining redundant discrete raw alerts from unstructured data-in-transit, the method to be performed by a computer system comprising generating a movable time window and using the movable time window to encompass a first set of discrete raw alerts in the unstructured data-in-transit, wherein the data-in-transit are arranged in a chronological order, and wherein each discrete raw alert comprises a data component and a time component; generating a digital signature for each discrete raw alert encompassed within the time window using the data component contained in each discrete raw alert; processing the generated digital signatures, the processing of each generated digital signature comprises: matching a generated digital signature with digital signatures stored in a meta-definition database, if the generated digital signature matches with digital signatures stored in the meta-definition database, adding the matched digital signature to a severity threshold database, and if the generated digital signature does not match digital signatures stored in the meta-definition database, adding unmatched digital signatures to the meta-definition database, whereby, for digital signatures in the severity threshold database that have incident counts exceeding a predetermined incident count threshold, marking such digital signatures as redundant digital signatures and marking raw alerts associated with redundant digital signatures as redundant raw alerts; and marking raw alerts having unmatched digital signatures as non-redundant raw alerts, and aggregating, compressing and encrypting non-redundant raw alerts.

With reference to the first aspect, in a first possible implementation of the first aspect, the method further comprises moving the movable time window to encompass a second set of discrete raw alerts in the unstructured data-in-transit, wherein the second set of discrete raw alerts are later in the chronological order than the first set of discrete raw alerts; generating a digital signature for each discrete raw alert encompassed within the time window using the data component contained in each discrete raw alert; processing the generated digital signatures, the processing of each generated digital signature comprises: matching a generated digital signature with digital signatures stored in a meta-definition database, if the generated digital signature matches with digital signatures stored in the meta-definition database, adding the matched digital signature to a severity threshold database, and if the generated digital signature does not match digital signatures stored in the meta-definition database, adding unmatched digital signatures to the meta-definition database, whereby, for digital signatures in the severity threshold database that have incident counts exceeding a predetermined incident count threshold, marking such digital signatures as redundant digital signatures and marking raw alerts associated with redundant digital signatures as redundant raw alerts; and marking raw alerts having unmatched digital signatures as non-redundant raw alerts, and aggregating, compressing and encrypting non-redundant raw alert.

With reference to the first aspect or the first possible implementation of the first aspect, in a second possible implementation of the first aspect, the digital signatures that are marked as redundant digital signatures are further marked with a time stamp indicating when the digital signature was marked as redundant whereby, after a period of time from the time stamp, the redundant digital signature is removed from the second database.

With reference to the first aspect or the first possible implementation of the first aspect, in a third possible implementation of the first aspect, the method further comprises removing redundant discrete raw alerts from the unstructured data-in-transit With reference to the first aspect or the first possible implementation of the first aspect, in a fourth possible implementation of the first aspect, the generating the digital signature for each discrete raw alert comprises: using a cryptographic hash function to generate the digital signature whereby the digital signature comprises a hash value.

With reference to the fourth possible implementation of the first aspect, in a fifth possible implementation of the first aspect, the cryptographic hash function comprises a 256-bit Secure Hash Algorithm (SHA).

With reference to the first possible implementation of the first aspect, in a sixth possible implementation of the first aspect, the moving the movable time window to encompass the second set of discrete raw alerts in the unstructured data-in-transit comprises: dynamically changing a size of the movable time window wherein the size of the movable time window is increased if a ratio of non-redundant raw alerts to redundant raw alerts is higher than a 10:1 ratio; and moving the resized movable time window along the chronologically arranged data-in-transit to encompass the second set of discrete raw alerts.

BRIEF DESCRIPTION OF THE DRAWING

In order that various embodiments of the invention may be more clearly ascertained, embodiments will now be described, by way of example, with reference to the accompanying drawing, in which.

DETAILED DESCRIPTION

The various embodiments in accordance with the present invention relate to a method and system for analysing large volumes of raw unstructured data to identify redundant data blocks or redundant raw alerts within a movable timeframe/time-window or within a Binary Large Objects (BLOB) defined by the movable timeframe/time-window. In particular, the method and system analyses raw alerts received from a plurality of monitoring devices simultaneously, whereby raw alerts that are found to be unique in a particular time window are further processed in accordance with embodiments of the invention while redundant raw alerts contained within the particular time window are identified, marked and allowed to be processed accordingly. The time window then proceeds to encompass the next set of raw alerts whereby the next set of raw alerts are then similarly processed.

Figure 1:
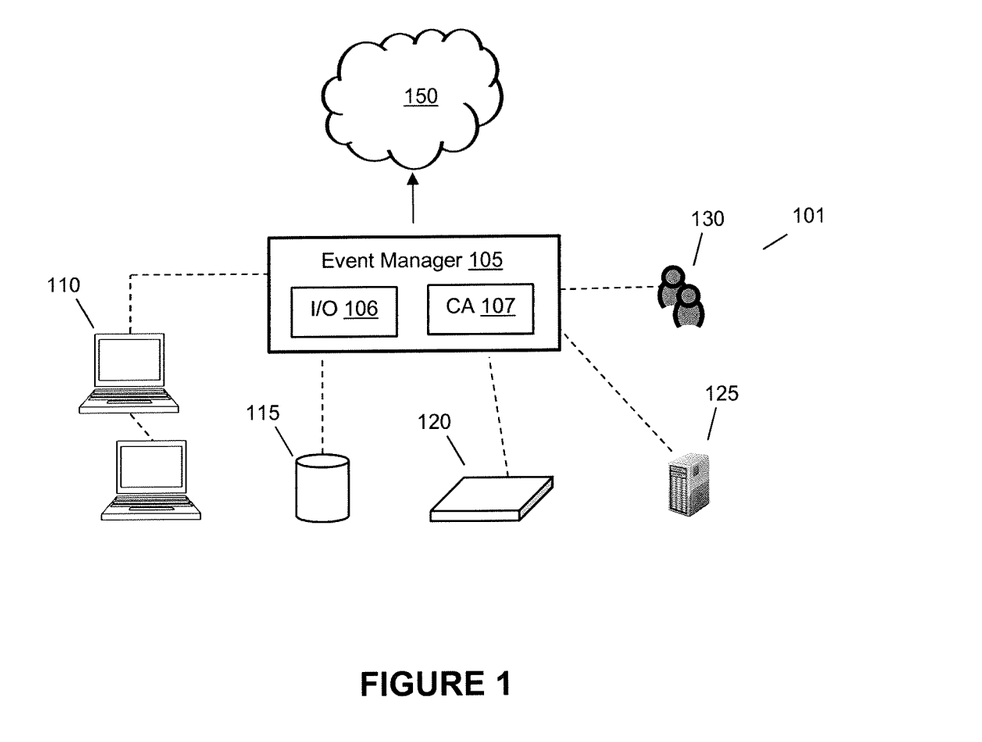
FIG. 1 illustrating a network diagram of devices in customer premise equipment in accordance with some embodiments of the invention.

FIG. 1 illustrates a network diagram of devices provided at a customer's premise in accordance with some embodiments of the invention. Customer premise equipment 101 includes event manager 105 that is configured to receive data traffic and information security events from various network devices. These network devices may be connected to event manager 105 through wireless or wired means and these network devices may include, but are not limited to, user devices 130, server 125, network monitoring device 120, gateway device 115 and computers 110. In addition to these network devices, other appliances (not shown) such as firewalls, routers, or switches may be utilized to collect log messages generated from other network devices whereby the collected log messages are then provided to event manager 105. It should be noted that event manager 105 may also be provided at a global command centre to receive event logs transmitted from event managers located at various locations.

As for network 150, network 150 is a communications network, such as the Internet, that allows computing devices and/or processing systems to communicate with one another either through wired means, wireless means or a combination of both. One skilled in the art will recognize that wired means may include, but are not limited to, a wired network such as a wide area network (WAN) or a local area network (LAN), while wireless means may include wireless communications established via Radio Frequency (RF) signals, or infrared signals.

Typically, event manager 105 is used to monitor mission critical security events as detected by the respective individual network devices in real-time. However, data sent to event manager 105 will not be in a uniformed format. In particular, the data will be transmitted in various formats and sizes from the various network devices to event manager 105. Formats that may be utilized by the network devices include, but are not limited to, raw Transmission Control Protocol (TCP)/User Datagram Protocol (UDP) connections, or other protocols such as Simple Network Management Protocol (SNMP), Simple Mail Transfer Protocol (SMTP), Home network Topology identifying Protocol (HTIP), File Transfer Protocol (FTP) and any other application non-streaming protocols and non-application streaming protocols.

The data from the various network devices are then received at event manager 105 using input/output (I/O) plugins 106 that act as interfaces between the respective network devices and event manager 105. Each type of network device will be assigned its own I/O plugin 106 at event manager 105 as the I/O plugins are technology specific. This means that in the embodiment illustrated in FIG. 1, event manager 105 is illustrated as having five I/O plugins that is one plugin for each type of network device connected to event manager 105.

Event manager 105 is also configured to execute software, memory or programme instances for each of the technology specific I/O plugins. This ensures that the data received by each I/O plugin may be independently processed by its own isolated instance. Hence, data received from the network devices may all be processed in parallel thereby ensuring that large volumes of data may be simultaneously attended to. Event manager 105 also includes cache analyser (CA) module 107. CA module may be in the form of a software programme; instructions stored in a memory or may be hardwired in hardware. The CA module 107 is configured to execute cache analyser processes in accordance with embodiments of the invention. These cache analyser processes are configured to take place in each of the instances whereby each cache analyser process within each instance is executed independently from processes occurring in a next instance.

Data traffic received by each of the technology specific I/O plugins 106 in event manager 150 may be stored as a chronological sequence of raw alerts in their respective instances. An example of a time series of raw alerts as received by an instance in event manager 105 is illustrated at table 200 in FIG. 2a. One skilled in the art will recognize that the raw alerts may be presented in other formats and styles without departing from this invention. It should also be noted that the raw alerts are discrete in time as each raw alert may be associated with a time or time range of receipt. In the example illustrated in FIG. 2a, the time component or time range of receipt are categorized under the column timeframe 205 while each raw alert data component is categorized under the column data 210.

Figure 2A:
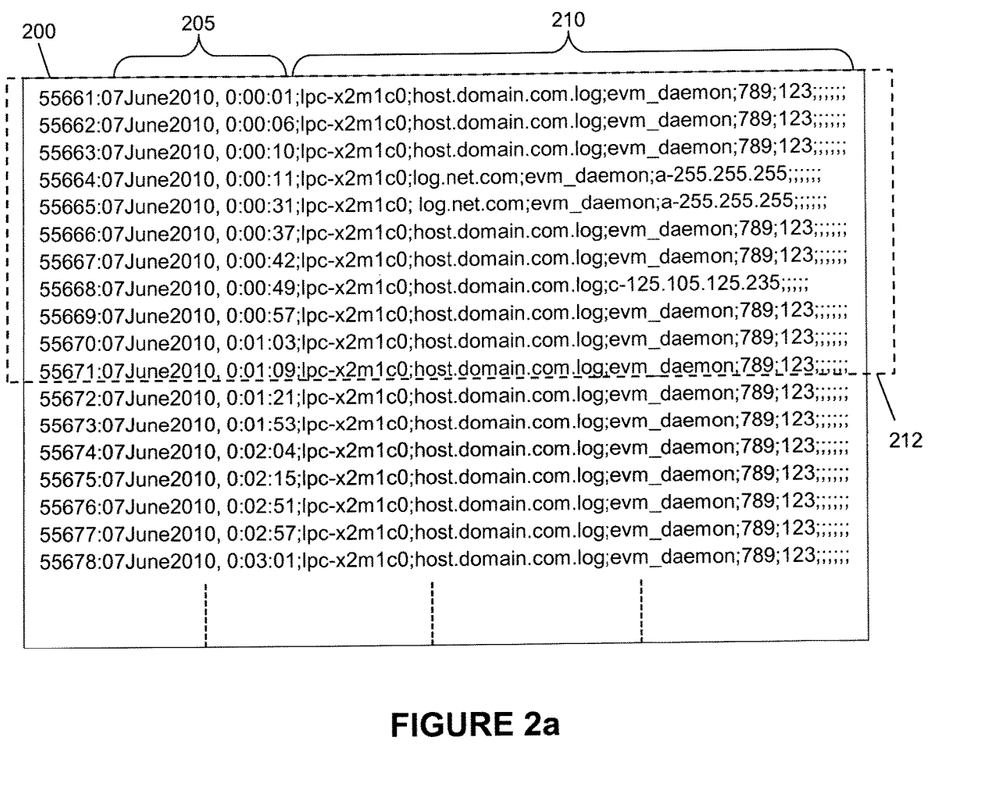
FIG. 2a illustrating an example of raw unstructured data in accordance with some embodiments of the invention.

The raw alerts are stored in their respective instances as discrete raw alerts in a first-in-first-out manner whereby raw alerts that are received first will be processed first by CA module 107. In embodiments of the invention, each discrete raw alert may be made up of data traffic/alerts received during a particular time or time range. In further embodiments of this invention, the time range of receipt may be in milliseconds, but it will be appreciated that other time periods may be employed. It should be noted that it is immaterial if the size of the raw alerts vary from one to the next as the information contained within each discrete raw alert will be processed individually and independently.

Figure 2B:
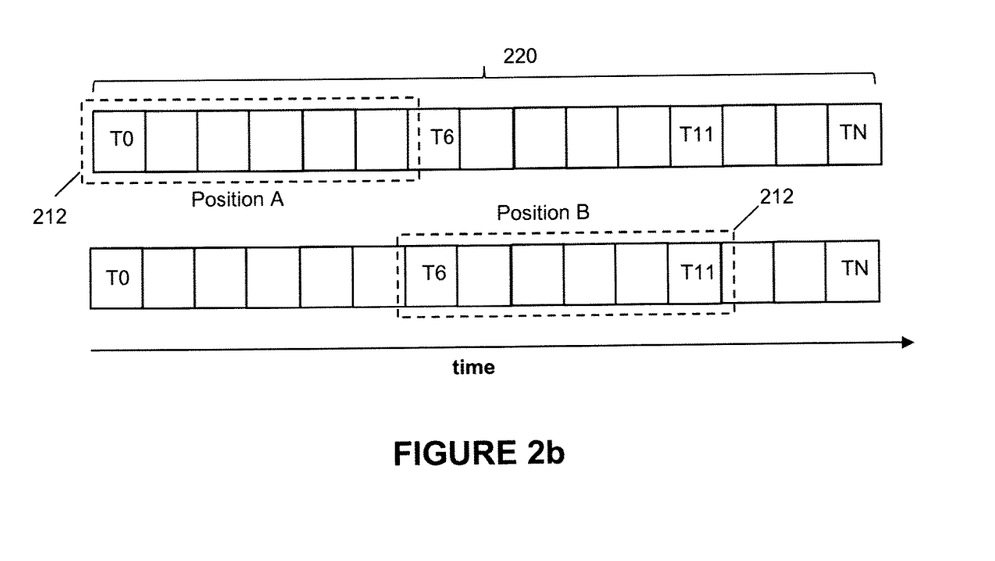
FIG. 2b illustrating discrete raw alerts arranged in a chronological order together with a movable time window in accordance with some embodiments of the invention.

In many embodiments of the invention, the raw alerts may be grouped into a time window of raw alerts or a BLOB of raw alerts whereby each time window comprises a movable selection "window", i.e. window 212. The maximum size of this sliding selection window is determined by a buffer size of the instance and its minimum size is left as a design choice to one skilled in the art. This movable selection window may be employed to chronologically select two or more successive discrete raw alerts from the data traffic received. This set of selected raw alerts may be referred to as the "T0, T1 ... T+N" raw alerts whereby N represents the Nth raw alert in the window. After the raw alerts within the movable selection window have been processed, the movable selection window then proceeds to encompass the next set of raw alerts. It should be noted that this movable selection window continually encompasses the next set of raw alerts in a chronological order after the present raw alerts in the window have been processed. In embodiments of the invention, the size of the sliding selection window may be dynamically varied during operation resulting in different set sizes being processed.

An exemplary illustration of the movable selection window 212 described above is also shown in FIG. 2b. FIG. 2b illustrates a chronological series of discrete raw alerts 220, from T0 ... T6 ... TN. In this illustration, T0 represents a discrete raw alert that was first received by an instance while TN represents the last discrete raw alert that was received by the same instance. In operation, the movable window 212 will first encompass discrete raw alerts T0-T5, i.e. at position A. After the raw alerts within movable window 212 at position A have been processed, movable window 212 then proceeds to encompass the next set of raw alerts in a chronological order. Movable window 212 will then encompass discrete raw alerts T6-T11, i.e. at position B. Movable window 212 then moves on to encompass the next set of raw alerts. Alternatively, the chronological selection operation of the movable window may be described as follows. After the movable selection window has completed the processing of discrete raw alerts received between an exemplary time period, e.g. between a time period of 0.1 milliseconds-0.3 milliseconds, the movable selection window then proceeds to encompass the next chronological set of discrete raw alerts, i.e. discrete raw alerts received between a time period of 0.4 milliseconds-0.6 milliseconds (under the assumption that the movable selection window has a buffer size of 0.3 milliseconds) for further processing.

Figure 3:
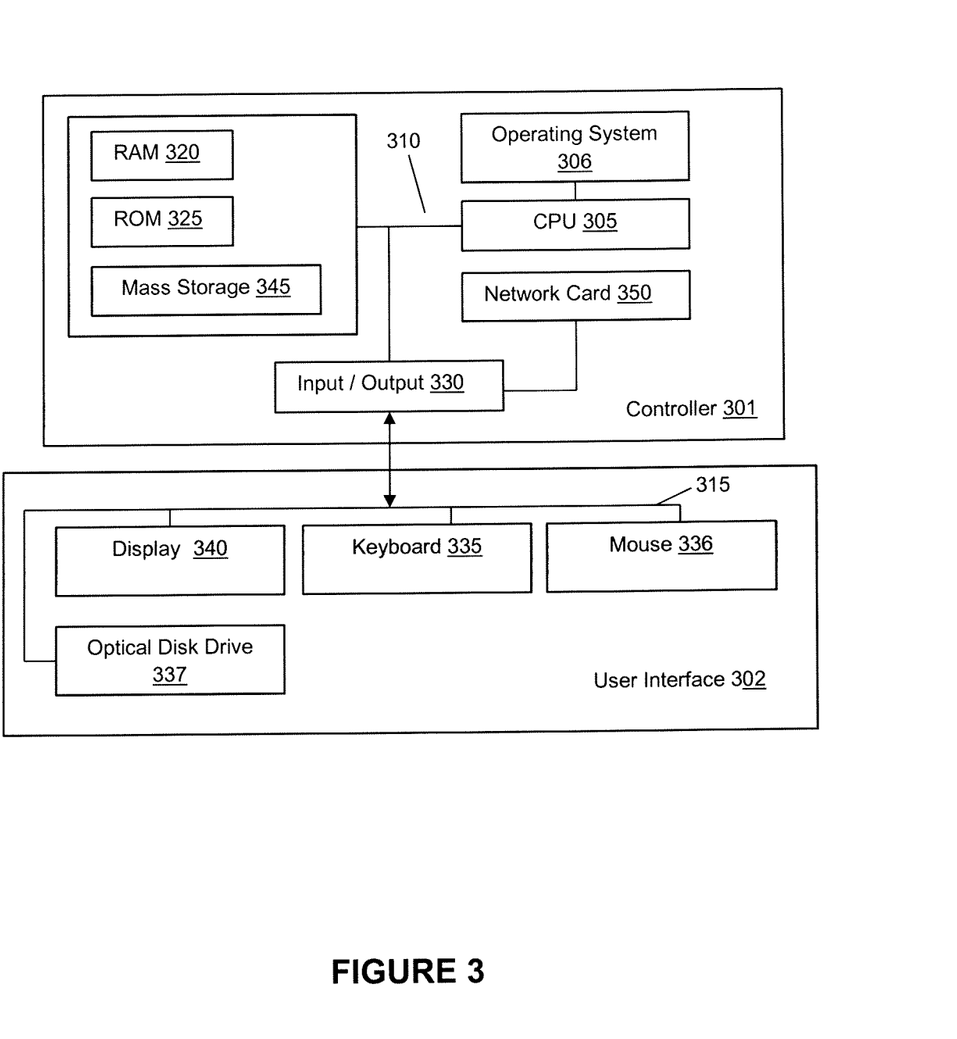
FIG. 3 illustrating a schematic view of a controller and a user interface of an event manager in accordance with embodiments of the invention.

In some embodiments of the invention, event manager 105 comprises controller 301 and user interface 302. User interface 302 is arranged to enable manual interactions between a user and event manager 105 and for this purpose includes the input/output components required for the user to enter instructions to control event manager 105. It will be appreciated, however, that user interface 302 may be located remotely, and may in fact be in the form of the user interface of, for example, a personal computer or other types of computers and may be arranged to communicate with and to configure event manager 105 via, for example, network 150. A person skilled in the art will recognize that components of the user interface may vary from embodiment to embodiment but will typically include one or more of display 340, keyboard 335, mouse 336 and optical disk drive 337.

Controller 301 is in data communication with user interface 302 and includes memory components, Central Processing Unit (CPU) 305 mounted on a circuit board that processes instructions and data for performing the method of this embodiment, an operating system 306, an input/output (I/O) interface 330 for communicating with user interface 302 and a communications interface, in this embodiment in the form of a network card 350.

The memory components and operating system 306 are in data communication with CPU 305. The memory components include both volatile and non-volatile memory and more than one of each type of memory, including Random Access Memory (RAM) 320, Read Only Memory (ROM) 325 and a mass storage device 345, the last comprising one or more solid-state drives (SSDs). One skilled in the art will recognize that the memory components comprise non-transitory computer-readable media and shall be taken to comprise all computer-readable media except for a transitory, propagating signal. Typically, the instructions are stored as program code in the memory components but can also be hardwired. Herein the term "CPU" is used to refer generically to any device that can process such instructions and may include: a microprocessor, microcontroller, programmable logic device or other computational device, but is typically server class (in view of the computational demands it will generally meet). That is, CPU 305 may be provided by any suitable logic circuitry for receiving inputs, processing them in accordance with instructions stored in memory and generating outputs (for example to the memory components or on display 340). In this embodiment, CPU 305 may be a single core or multi-core processor with shared memory addressable space. In one example, CPU 305 may be multi-core, comprising—for example—an 8 core CPU. Network card 350 may, for example, be utilized to send data from event manager 105 via network 150 to other processing devices or to receive data via network 150.

After the data traffic has been received and queued to be processed in their respective virtual machine emulations, CA module 107 will execute a series of processes to determine which discrete raw alerts may be classified as redundant or non-redundant. In accordance with embodiments of the invention, a method for determining redundant raw alerts from unstructured data-in-transit comprises the following steps:

Step 1, generating a movable time window and using the movable time window to encompass a first set of discrete raw alerts in the unstructured data-in-transit, wherein the data-in-transit are in chronological order, and wherein each discrete raw alert comprises a data component and a time component;

Step 2, generating a digital signature for each discrete raw alert encompassed within the time window using the data component contained in each discrete raw alert;

Step 3, processing the generated digital signatures, the processing of each generated digital signature comprises the steps of:

Step (i), matching a generated digital signature with digital signatures stored in a meta-definition database, if the generated digital signature matches with digital signatures stored in the meta-definition database, adding the matched digital signature to a severity threshold database, and if the generated digital signature does not match digital signatures stored in the meta-definition database, adding unmatched digital signatures to the meta-definition database, Step (ii) whereby, for digital signatures in the severity threshold database that have incident counts exceeding a predetermined incident count threshold, marking such digital signatures as redundant digital signatures and marking raw alerts associated with redundant digital signatures as redundant raw alerts;

Step 4, marking raw alerts having unmatched digital signatures as non-redundant raw alerts, and aggregating, compressing and encrypting non-redundant raw alerts.

Figure 4:
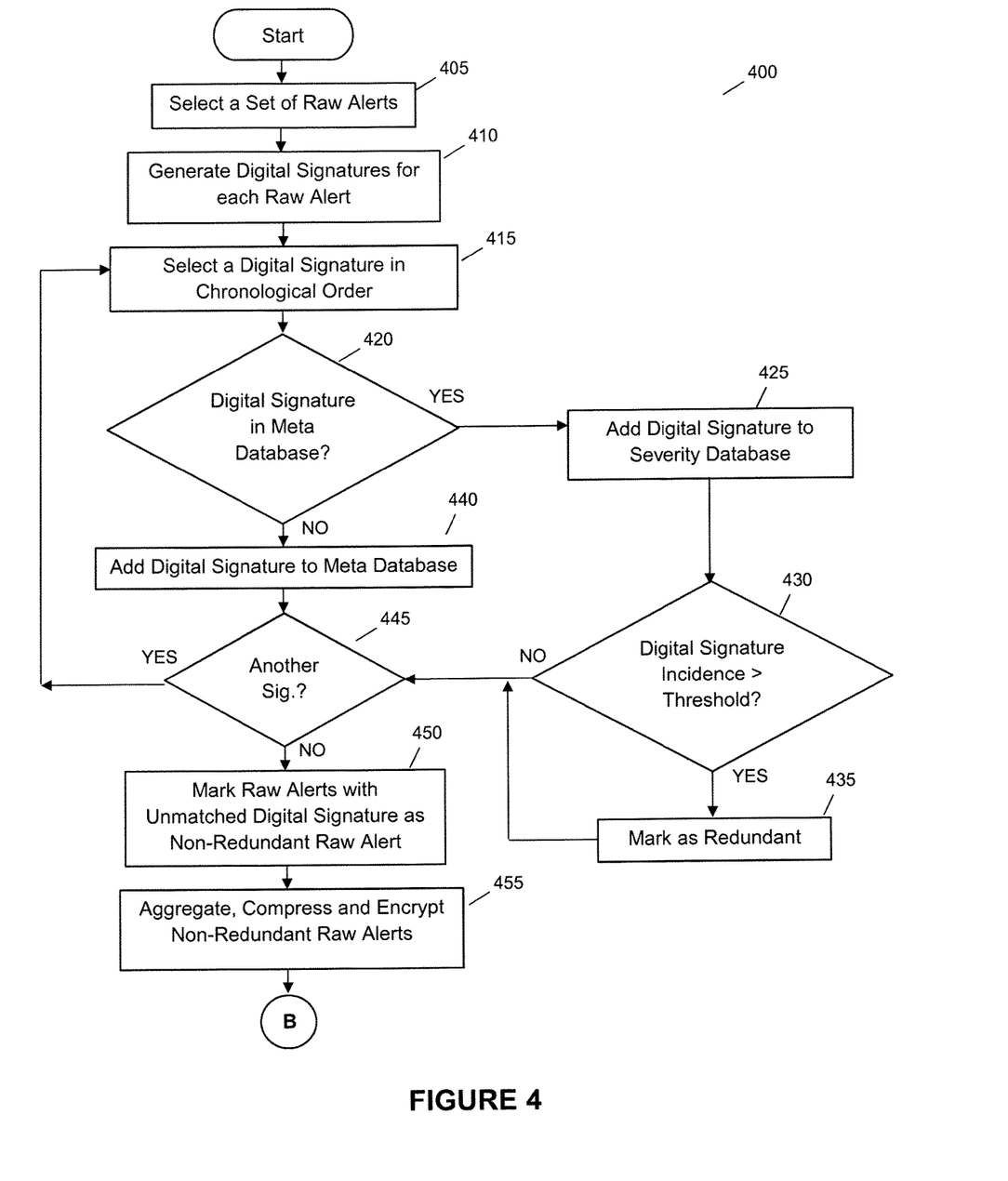
FIG. 4 illustrating a flow diagram of a process for categorizing redundant and non-redundant raw alerts in accordance with embodiments of the invention.
Figure 5:
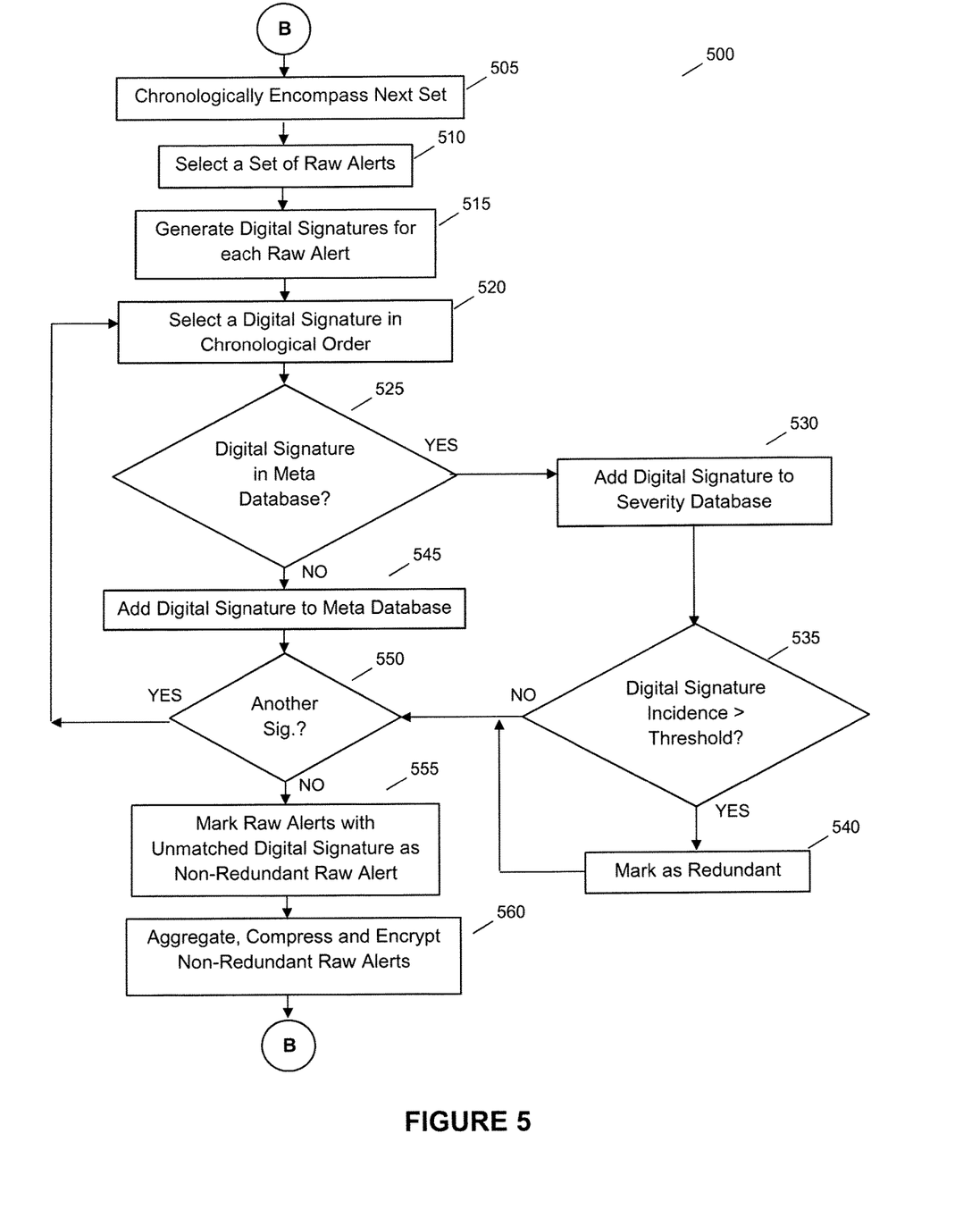
FIG. 5 illustrating a flow diagram of a process for categorizing redundant and non-redundant raw alerts of a subsequent time window in accordance with embodiments of the invention.

The following description and FIGS. 4-5 describe embodiments of processes that may be executed by CA module 107 in accordance with many embodiments of this invention. FIG. 4 illustrates process 400 that is performed by a computer system to determine redundant discrete raw alerts from unstructured data-in-transit in accordance with a number of embodiments of this invention. It will be appreciated that multiple threads of the following processes typically occur in parallel as virtual machine emulations will be spawned for each of the technology specific I/O plugins whereby each of the virtual machine emulations are configured to receive a steady input of discrete raw alerts of data traffic.

Process 400 begins by generating a movable time window of a particular size to encompass discrete raw alerts contained within an instance created by the computer system. The size of the movable time window may be dynamically varied by the computer system. In accordance with many embodiments of the invention, if it is determined that a ratio of non-redundant raw alerts to redundant raw alerts exceeds a 5:1 ratio, or a larger 10:1 ratio, the size of the movable time window may be dynamically increased so that subsequently, a larger number of discrete raw alerts will be encompassed and simultaneously processed within the time window. This is so that a larger number of redundant raw alerts may be captured within a single time window. One skilled in the art will recognize that other larger ratios may be chosen without departing from various embodiments of this invention.

Process 400 then selects all the discrete raw alerts contained within the timeframe/time-window. This means that discrete raw alerts having a time component or a time/period of receipt that falls within the range of the time window will be selected at step 405. Process 400 then proceeds to generate digital signatures for the data components of each of the raw alerts contained within the time window. It should be noted that the time component in each discrete raw alert is not utilized in the generation of the digital signatures. After the digital signatures have been generated and stored for all the selected raw alerts, each of the digital signatures are then processed in a chronological manner. This means that at step 415, process 400 will first process a digital signature that has the earliest time component or time of receipt amongst all the other digital signatures. Process 400 will then determine if the selected digital signature matches with any of the digital signatures that are contained within a meta-definition database at step 420. The meta-definition database may comprise a database module stored within the computer system or may comprise a cloud based storage system. If the selected digital signature matches with a digital signature contained within the meta-definition database, process 400 proceeds to step 425. If a match is found, this means that this digital signature has been previously processed by process 400 before. Conversely, if a match is not found, this means that this digital signature has not been previously processed by process 400.

At step 425, the matched digital signature is then added to a severity threshold database. Similarly, the second database may comprise a database module stored within the computer system or may comprise a cloud based storage system. If the matched digital signature has previously been added to the severity threshold database, the incidence count or occurrence count of the matched digital signature is increased accordingly. For example, if the severity threshold database contains a digital signature "XYER12684V" and if a matched signature that is to be added to the severity threshold database comprises a similar digital signature, ""XYER12B84V", the incidence count of this digital signature will be increased in severity threshold database from one (1) to two (2) accordingly.

Process 400 then determines at step 430 whether the incidence count of the particular digital signature has exceeded a predetermined threshold. This threshold may be any integer set by the administrator of the computer system, for example it may be one, ten or twenty. In an embodiment of the invention, the threshold is set as two. If the administrator wishes for more raw alerts to be classified as redundant, the threshold is set to a low value number and vice versa. If it is determined at step 430 that the incidence count of the digital signature exceeds a threshold, process 400 proceeds to step 435 whereby that particular digital signature is then marked as a redundant signature. In addition to marking the digital signature, process 400 also marks the discrete raw alert that generated that particular digital signature as a redundant discrete raw alert. Process 400 then proceeds to step 445. Alternatively, if it is determined at step 430 that the incidence count of the digital signature does not exceed the threshold, process 400 proceeds to step 445 instead.

Returning to step 420. If it is determined at this step that the selected digital signature does not match with the digital signatures in the meta-definition database, process 400 proceeds to step 440 whereby the selected digital signature is added to the meta-definition database. Process 400 then proceeds to step 445. At step 445, process 400 checks whether there is another digital signature that has not yet been processed by steps 425-445. If there are digital signatures that remain unprocessed, process 400 proceeds to step 415, which is to select the next digital signature in the chronological sequence. Process 415-445 continuously repeats until all the digital signatures in the time window have been processed by process 400. Once this is done, process 400 proceeds to step 450.

At step 450, process 400 then proceeds to mark discrete raw alerts having unmatched digital signatures as non-redundant discrete raw alert. The non-redundant discrete raw alert are then aggregated, compressed and encrypted by process 400 at step 455. This allows the processed data to be easily and rapidly transmitted as required.

In some embodiments of the invention, discrete raw alert that are marked as redundant are deleted from the data-in-transit thereby reducing the amount of data that is to be further processed by the computer system. In some other embodiments of the invention, digital signatures that are marked as redundant digital signatures at step 435 are further marked with a time stamp. This time stamp provides an indication as to when the digital signature was marked as redundant. After a period of time has lapsed, whereby this period of time may comprise multiples of the time window, the digital signature that is marked as redundant is removed from the severity threshold database, thereby refreshing the incidence count of that particular digital signature. The refreshing of select information in the severity threshold database is useful when large amounts of data-in-transit are to be processed.

In many embodiments of the invention, a digital signature for each raw alert may comprise a hash value that is generated using a cryptographic hash function. The cryptographic hash function converts or maps sets of variable length data from the data component of each discrete raw alert into smaller fixed-length datasets known as hash values. These hash values may then be stored in the meta-definition tables as required. The cryptographic hash function utilized may include, but is not limited to, a Secure Hash Algorithm (SHA) that generates a 256-bit hash.

In some embodiments of the invention, a digital signature for each discrete raw alert may also be generated using algorithms for solving Longest Common Sequence (LCS) or Shortest Edit Script (SES) problems such as the O(NP) Sequence Comparison Algorithm, the O(ND) Sequence Difference Algorithm, the Hunt-Szymanski LCS algorithm or any other such algorithms. In accordance with some of these embodiments of the invention, the matching of a digital signature with digital signatures contained in the first database comprises determining if a difference between the digital signature and a digital signature stored in the first database exceeds a severity threshold whereby if the difference does not exceed the severity threshold, a match is indicated between the digital signature and a digital signature contained in the first database.

FIG. 5 illustrates process 500 that is performed by a computer system to determine which discrete raw alerts are to be classified as redundant from a new set of discrete raw alerts that are encompassed by the movable time window. Process 500 resumes from step B of process 400 (see FIG. 4) at step 505 and begins by moving the time window to encompass the next set of discrete raw alerts in the chronological sequence of discrete raw alerts. Process 500 selects all the discrete raw alerts contained within the time window at step 510. Process 500 then proceeds to generate digital signatures for each of the discrete raw alerts contained within the time window at step 515. After the digital signatures have been generated and stored for all the selected discrete raw alerts, each of the digital signatures are then processed in a chronological manner. This means that at step 520, process 500 will first process a digital signature that has the earliest time stamp or time of receipt amongst all the other digital signatures. Process 500 will then determine if the selected digital signature matches with any of the digital signatures that are contained within the meta-definition database at step 525. If the selected digital signature matches with a digital signature contained within the meta-definition database, process 500 proceeds to step 530.

At step 530, the matched digital signature is then added to the severity threshold database. If the matched digital signature has previously been added to the severity threshold database, the incidence count or occurrence count of the matched digital signature is increased accordingly. Process 500 then determines at step 535 whether the incidence count of the particular digital signature has exceeded a threshold. If it is determined at step 535 that the incidence count of the digital signature exceeds a threshold, process 500 proceeds to step 540 whereby that particular digital signature is then marked as a redundant signature. In addition to marking the digital signature, process 500 also marks the raw alert that generated that particular digital signature as a redundant discrete raw alert. Process 500 then proceeds to step 550. Alternatively, if it is determined at step 535 that the incidence count of the digital signature does not exceed the threshold, process 500 proceeds to step 550 instead.

Returning to step 525. If it is determined at this step that the selected digital signature does not match with the digital signatures in the meta-definition database, process 500 proceeds to step 545 whereby the selected digital signature is added to the meta-definition database. Process 500 then proceeds to step 550. At step 550, process 500 checks whether there is another digital signature that has not yet been processed by steps 530-550. If there are digital signatures that remain unprocessed, process 500 proceeds to step 520, which is to select the next digital signature in the chronological sequence. Process 520-550 continuously repeats until all the digital signatures in the time window have been processed by process 500. Once this is done, process 500 proceeds to step 555.

At step 555, process 500 then proceeds to mark discrete raw alerts having unmatched digital signatures as non-redundant discrete raw alerts. The non-redundant discrete raw alerts are then aggregated, compressed and encrypted by process 500 at step 560. Process 500 may then proceed to step B whereby the time window is incremented chronologically to encompass the next set of discrete raw alerts in the chronological sequence of discrete raw alerts in the data-in-transit and process 500 repeats from step 505-560 for the newly encompassed set of discrete raw alerts.

Modifications within the scope of the invention may be readily effected by those skilled in the art. It is to be understood, therefore, that this invention is not limited to the particular embodiments described by way of example hereinabove. Further, any reference herein to prior art is not intended to imply that such prior art forms or formed a part of the common general knowledge in any country.

The above is a description of some embodiments of a system and process in accordance with the present invention as set forth in the following claims. It is envisioned that others may and will design alternatives that fall within the scope of the following claims.

The invention claimed is:

1. A method for determining redundant discrete raw alerts from unstructured data-in-transit, the method to be performed by a computer system comprising:

generating a movable variable sized time window and using the movable variable sized time window to encompass a first set of discrete raw alerts in the unstructured data-in-transit, wherein the data-in-transit are arranged in a chronological order, and wherein each discrete raw alert comprises a data component and a time component;

generating a digital signature for each discrete raw alert encompassed within the variable sized time window using the data component contained in each discrete raw alert;

processing the generated digital signatures, the processing of each generated digital signature comprises:

matching a generated digital signature with digit al signatures stored in a meta-definition database, if the generated digital signature matches with digital signatures stored in the meta-definition database, adding the matched digital signature to a severity threshold database, and if the generated digital signature does not match digital signatures stored in the meta-definition database, adding unmatched digital signatures to the meta-definition database, whereby, for digital signatures in the severity threshold database that have incident counts exceeding a predetermined incident count threshold, marking such digital signatures as redundant digital signatures and marking raw alerts associated with redundant digital signatures as redundant raw alerts; and marking raw alerts having unmatched digital signatures as non-redundant raw alerts, and aggregating, compressing and encrypting non-redundant raw alerts.

2. The method according to claim 1 further comprising:

generating the movable variable sized time window and moving the variable sized time window to encompass a second set of discrete raw alerts in the unstructured data-in-transit, wherein the second set of discrete raw alerts are later in the chronological order than the first set of discrete raw alerts;

generating a digital signature for each discrete raw alert encompassed within the variable sized time window using the data component contained in each discrete raw alert;

processing the generated digital signatures, the processing of each generated digital signature comprises:

matching a generated digital signature with digital signatures stored in a meta-definition database, if the generated digital signature matches with digital signatures stored in the meta-definition database, adding the matched digital signature to a severity threshold database, and if the generated digital signature does not match digital signatures stored in the meta-definition database, adding unmatched digital signatures to the meta-definition database, whereby, for digital signatures in the severity threshold database that have incident counts exceeding a predetermined incident count threshold, marking such digital signatures as redundant digital signatures and making raw alerts associated with redundant digital signature as redundant raw alerts; and making raw alerts having unmatched digital signatures as non-redundant raw alerts, and aggregating, compressing and encrypting non-redundant raw alerts.

3. The method according to claim 1 wherein digital signatures that are marked as redundant digital signatures are further marked with a time stamp indicating when the digital signature was marked as redundant whereby, after a period of time from the time stamp, redundant digital signatures are removed from the severity threshold database.

4. The method according to claim 2 further comprising: removing redundant raw alerts from the unstructured data-in-transit.

5. The method according to claim 1 wherein the generating the digital signature for each discrete raw alert comprises:
using a cryptographic hash function to generate the digital signature whereby the digital signature comprises a hash value.

6. The method according to claim 5 wherein the cryptographic hash function comprises a 256-bit Secure Hash Algorithm (SHA).

7. The method according to claim 2 wherein the generating the movable variable sized time window comprises:
dynamically changing a size of the movable variable sized time window, wherein the size of the movable variable sized time window is increased if a ratio of non-redundant raw alerts to redundant raw alerts is higher than a predetermined ratio.

8. A system for determining redundant discrete raw alerts from unstructured data-in-transit comprising:
circuitry configured to generate a movable variable sized time window and to use the movable variable sized time window to encompass a first set of discrete raw alerts in the unstructured data-in-transit, wherein the data-in-transit are arranged in a chronological order, and wherein each discrete raw alert comprises a data component and a time component;
circuitry configured to generate a digital signature for each discrete raw alert encompassed within the movable variable sized time window using the data component contained in each discrete raw alert;
circuitry configured to process the generated digital signatures comprising:
circuitry configured to match a generated digital signature with digital signatures stored in a meta-definition database, if the generated digital signature matches with digital signatures stored in the meta-definition database, the circuitry is configured to add the matched digital signature to a severity threshold database, and if the generated digital signature does not match digital signatures stored in the meta-definition database, the circuitry is configured to add unmatched digital signatures to the meta-definition database,
whereby, for digital signatures in the severity threshold database that have incident counts exceeding a predetermined incident count threshold, the circuitry is configured to mark such digital signatures as redundant digital signatures and the circuitry is configured to mark raw alerts associated with redundant digital signatures as redundant raw alerts; and
circuitry configured to mark raw alerts having unmatched digital signatures as non-redundant raw alerts, and to aggregate, compress and encrypt non-redundant raw alerts.

9. The system according to claim 8 further comprising:
circuitry configured to generate the movable variable sized time window and move the movable variable sized time window to encompass a second set of discrete raw alerts in the unstructured data-in-transit, wherein the second set of discrete raw alerts are later in the chronological order than the first set of discrete raw alerts;
circuitry configured to generate a digital signature for each discrete raw alert encompassed within the time window using the data component contained in each discrete raw alert;
circuitry configured to process the generated digital signatures comprising:
circuitry configured to match a generated digital signature with digital signatures stored in a meta-definition database, if the generated digital signature matches with digital signatures stored in the meta-definition database, the circuitry is configured to add the matched digital signature to a severity threshold database, and if the generated digital signature does not match digital signatures stored in the meta-definition database, the circuitry is configured to add unmatched digital signatures to the meta-definition database,
whereby, for digital signatures in the severity threshold database that have incident counts exceeding a predetermined incident count threshold, the circuitry is configured to mark such digital signatures as redundant digital signatures and the circuitry is configured to mark raw alerts associated with redundant digital signatures as redundant raw alerts; and
circuitry configured to mark raw alerts having unmatched digital signatures as non-redundant raw alerts, and to aggregate, compress and encrypt non-redundant raw alerts.

10. The system according to claim 8 wherein digital signatures that are marked as redundant digital signatures are further marked with a time stamp indicating when the digital signature was marked as redundant whereby, after a period of time from the time stamp, the circuitry is configured to remove redundant digital signatures from the severity threshold database.

11. The system according to claim 8 further comprising:
circuitry configured to remove redundant raw alerts from the unstructured data-in-transit.

12. The system according to claim 8 wherein the circuitry configured to generate the digital signature for each discrete raw alert comprises:
circuitry configured to use a cryptographic hash function to generate the digital signature whereby the digital signature comprises a hash value.

13. The system according to claim 12 wherein the cryptographic hash function comprises a 256-bit Secure lash Algorithm (SHA).

14. The system according to claim 8 wherein the circuitry configured to generate the movable variable sized time window comprises:
circuitry configured to dynamically change a size of the movable variable sized time window wherein the size of the movable variable sized time window is increased if a ratio of non-redundant raw alerts to redundant raw alerts is higher than a 10:1 ratio.

* * * * *